Figure 1:
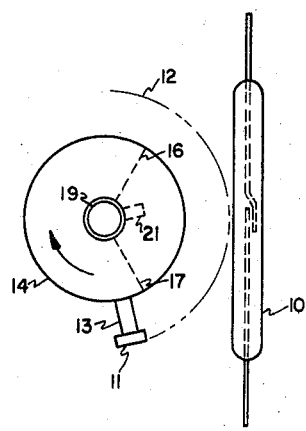

May 3, 1966  T. H. BRIGGS  3,249,713
MAGNETIC SWITCH CONTROL SENSOR
Filed July 27, 1961

INVENTOR.
THOMAS H. BRIGGS
BY Laurence R. Brown 3,249,713
MAGNETIC SWITCH CONTROL SENSOR
Thomas H. Briggs, Malvern, Pa., assignor, by mesne assignments, to Symington Wayne Corporation, Salisbury, Md., a corporation of Maryland
Filed July 27, 1961, Ser. No. 127,281
7 Claims. (Cl. 200—87)

This invention relates to a control sensing device, and, more particularly, it relates to shaft rotation detection means.

In automation control systems it is desirable to detect the position of a shaft, such as for counting shaft revolutions. Such systems many times require timed pulses of short duration and cannot tolerate the possibility of the shaft motion being stopped in a sensing position. With use of magnetic takeoff devices where intermittent shaft motion may occur, the time of sensing and extent of flux varies considerably, thus causing unreliable operation. It is, therefore, an object of this invention to provide improved magnetic shaft rotation detection means.

In accordance with the invention, a rotatable magnetic arm is caused to drive a pair of magnetically responsive switch contacts. In order to assure a constant closure timing and to avoid the possibility of the shaft stopping in position to maintain the switch contacts in closed position, a controlled driving magnet is used. The control may be simply provided by use of gravity to obtain free fall of the magnet during a portion of arcuate path in the rotation of the shaft.

Figure 2:
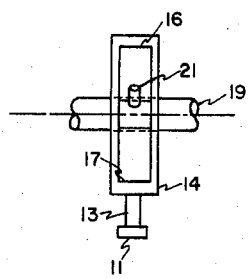

The invention may be better understood by reference to the drawing in which:

FIGURE 1 represents an end view of a shaft with accompanying rotation sensor, and FIGURE 2 represents a side view of the shaft and sensor.

Referring now to the figures, it may be seen that a magnetically driven reed switch 10 may be driven by magnet 11 for contact closure as the magnet falls through the path indicated by the dotted arcuate line 12. A sector within the disc 14 is defined by walls 16 and 17. The disc 14 is permitted to rotate freely on shaft 19 to which pin 21 is affixed to drive the disc. Thus, if rotation of the shaft is in the direction of the arrow, the pin 21 will engage wall 17 to drive the disc.

However, as the pin reaches the topmost position, it permits the disc to continue rotation at a faster speed than the driven speed because of the force of gravity upon the magnet 11 upon extension arm 13.

It may be seen that the magnetic force is a function of the rate of cutting of magnetic lines of flux and, therefore, much more positive action is possible than with a completely shaft driven magnet. In addition, it is impossible for the shaft to stop in any position in which the reed switch 10 has its contacts closed.

Accordingly the shaft rotation sensing device of this invention provides improved performance for which Letters Patent are requested for the novel features defined in the following claims.

I claim:
1. A shaft rotation sensor comprising in combination, a set of magnetically actuated switch contacts; a magnet; a rotatable shaft; means coupled to said shaft for driving said magnet through an arcuate path about said shaft extending less than 360°; means permitting said magnet to be carried through the balance of said 360° path about said shaft free of said coupling means utilizing the force of gravity; said switch contacts being activated only when said magnet is within a delineated zone of its arcuate path of travel.

2. A shaft rotation sensor comprising a driven shaft; a disc rotatably mounted on said shaft transverse to the axis thereof; said disc further including sector-defining detents; a projection on said driven shaft confined within the sector defined by said detents; a magnet peripherally affixed to said disc; and a magnetically actuated switch proximate the circular path of travel of said magnet; rotation of said shaft causing said magnet to be positively driven through a portion of its arcuate path and to move under gravitational forces for the balance of its path, said switch being activated through only one sector of the magnet's path.

3. A shaft rotation sensor comprising a rotatable shaft; a magnet holder mounted for free rotation on said shaft; a magnet mounted on said holder and carried thereby in a circular orbit about the longitudinal axis of said shaft; means for limiting the free rotation of said magnet holder with respect to said shaft; and a magnetically actuated switch proximate the orbit of said magnet, said switch being activated by said magnet through only one sector of its orbit.

4. A rotation sensor comprising a driven shaft; a disc mounted transversely on said shaft and rotatable thereabout, said disc further including internal sector defining walls; a radial projection on said driven shaft confined within said sector defining walls; a magnet mounted peripherally on said disc; and a magnetically actuated switch proximate the circular path of said magnet; rotation of said shaft causing said switch to be activated while said magnet is in a particular sector of its travel path.

5. A shaft rotation sensor comprising, in combination, a set of magnetically actuated reed switch contacts, a magnet, drive means mounted on a rotatable shaft for driving said magnet through an arcuate path of less than 360°, means for disengaging said drive means through the remainder of the arcuate path, means causing the magnet to attain a greater speed than that effected by said drive means during its path through the remainder of the arcuate path and means positioning the reed switch contacts for actuation by the magnet when passing through the remainder of the arcuate path.

6. A shaft rotation sensor comprising a magnet, magnetically actuated switch contacts, a rotatable shaft, means driving the magnet with the shaft during a first portion of rotation of the shaft, and separate gravity-utilizing means for passing the magnet near the switch contacts to drive them during a second portion of the rotation of the shaft.

7. A position sensing device comprising, in combination, a moving body, a magnet, a pair of magnetically actuated switch contacts, means driving the magnet responsive to the movement of said body, and means moving the magnet independent of said body during a portion of its movement, said magnet actuating the switch contacts during its motion independent of said body.

References Cited by the Examiner
UNITED STATES PATENTS

| 1,874,199 | 8/1932 | Lingo et al. | 200—87 |
| 2,908,778 | 10/1959 | Strandberg | 200—19 |

BERNARD A. GILHEANY, Primary Examiner.
MAX L. LEVY, R. K. SCHAEFER, Examiners.
BENJAMIN DOBECK, Assistant Examiner.